United States Patent
Shah et al.

(10) Patent No.: US 9,983,675 B2
(45) Date of Patent: May 29, 2018

(54) SYSTEMS AND METHODS FOR MONITORING INSULATION INTEGRITY FOR ELECTROSTATIC FRICTION (71) Applicant: Immersion Corporation, San Jose, CA (US)

(72) Inventors: Kaniyalal Shah, Fremont, CA (US); Vincent Levesque, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days. days.

(21) Appl. No.: 15/179,133

(22) Filed: Jun. 10, 2016

(65) Prior Publication Data

US 2017/0357316 A1    Dec. 14, 2017

(51) Int. Cl.
G06F 3/01        (2006.01)
G06F 3/041       (2006.01)

(52) U.S. Cl.
CPC ............ G06F 3/016 (2013.01); G06F 3/0416 (2013.01)

(58) Field of Classification Search
CPC .................. G06F 3/016; G06F 3/0416
See application file for complete search history.

(56) References Cited

U.S. PATENT DOCUMENTS

| | | | |
|---|---|---|---|
| 7,924,144 B2 | 4/2011 | Makinen et al. | |
| 7,982,588 B2 | 7/2011 | Makinen et al. | |
| 8,026,798 B2 | 9/2011 | Makinen et al. | |
| 8,462,125 B2 | 6/2013 | Birnbaum et al. | |
| 8,587,417 B2 | 11/2013 | Birnbaum et al. | |
| 8,638,301 B2 | 1/2014 | Birnbaum et al. | |
| 9,196,134 B2 | 11/2015 | Levesque et al. | |
| 2005/0240778 A1 | 10/2005 | Saito | |
| 2006/0152360 A1* | 7/2006 | Vatsaas | G08B 13/126 340/550 |
| 2009/0109021 A1 | 4/2009 | Paoletti et al. | |

(Continued)

FOREIGN PATENT DOCUMENTS

EP    1 524 586        4/2005
EP    2821912 A1       1/2015

(Continued)

OTHER PUBLICATIONS

Google I/O 2012—For Butter or Worse: Smoothing Out Performance in Android UIs, Published on Jun. 29, 2012, web page at http://www.youtube.com/watch?v=Q8m9sHdyXnE.

(Continued)

*Primary Examiner* — Premal Patel
(74) *Attorney, Agent, or Firm* — Kilpatrick Townsend & Stockton LLP (57) ABSTRACT

Systems and methods for monitoring insulation integrity for electrostatic friction are disclosed. One system may include a touch sensitive interface configured to detect user interaction; an electrostatic haptic output device configured to output one or more electrostatic haptic effects to the touch sensitive interface; a processor in communication with the touch sensitive interface and the electrostatic haptic output device, the processor configured to: determine an operating condition associated with the electrostatic haptic output device; determine a corrective action associated with the operating condition; and apply the corrective action.

18 Claims, 6 Drawing Sheets

(56) References Cited

U.S. PATENT DOCUMENTS

| | | | |
|---|---|---|---|
| 2009/0160780 A1* | 6/2009 | Arnold | G06F 3/041 |
| | | | 345/173 |
| 2010/0017489 A1 | 1/2010 | Birnbaum et al. | |
| 2010/0017759 A1 | 1/2010 | Birnbaum et al. | |
| 2010/0085169 A1 | 4/2010 | Poupyrev et al. | |
| 2010/0214243 A1 | 8/2010 | Birnbaum et al. | |
| 2010/0231367 A1 | 9/2010 | Cruz-Hernandez et al. | |
| 2010/0231508 A1 | 9/2010 | Cruz-Hernandez et al. | |
| 2010/0231539 A1 | 9/2010 | Cruz-Hernandez et al. | |
| 2010/0231540 A1 | 9/2010 | Cruz-Hernandez et al. | |
| 2010/0231541 A1 | 9/2010 | Cruz-Hernandez et al. | |
| 2010/0231550 A1 | 9/2010 | Cruz-Hernandez et al. | |
| 2012/0229400 A1 | 9/2012 | Birnbaum et al. | |
| 2012/0249470 A1* | 10/2012 | Sugiura | G06F 1/1694 |
| | | | 345/174 |
| 2012/0268412 A1* | 10/2012 | Cruz-Hernandez | G06F 3/0488 |
| | | | 345/174 |
| 2013/0016042 A1* | 1/2013 | Makinen | G06F 3/016 |
| | | | 345/168 |
| 2013/0057509 A1 | 3/2013 | Cruz-Hernandez et al. | |
| 2014/0118127 A1* | 5/2014 | Levesque | G06F 3/016 |
| | | | 340/407.2 |
| 2014/0139448 A1 | 5/2014 | Levesque et al. | |
| 2014/0139450 A1 | 5/2014 | Levesque et al. | |
| 2014/0139451 A1 | 5/2014 | Levesque et al. | |
| 2014/0139452 A1 | 5/2014 | Levesque et al. | |
| 2014/0253302 A1 | 9/2014 | Levesque et al. | |
| 2014/0267069 A1 | 9/2014 | Dionne | |
| 2015/0002427 A1 | 1/2015 | Katamoto | |
| 2015/0009168 A1* | 1/2015 | Levesque | H04M 19/04 |
| | | | 345/174 |
| 2015/0070148 A1* | 3/2015 | Cruz-Hernandez | G08B 6/00 |
| | | | 340/407.1 |
| 2015/0145657 A1 | 5/2015 | Levesque et al. | |
| 2015/0193074 A1* | 7/2015 | Cudak | G06F 3/0418 |
| | | | 345/173 |
| 2016/0299616 A1* | 10/2016 | Crowther | G06F 1/1643 |
| 2017/0052625 A1* | 2/2017 | Bryant | G06F 3/0418 |
| 2017/0090576 A1* | 3/2017 | Peterson | G06F 3/016 |

FOREIGN PATENT DOCUMENTS

| | | |
|---|---|---|
| EP | 2963523 A1 | 1/2016 |
| WO | 2011/018728 A1 | 2/2011 |

OTHER PUBLICATIONS

European Patent Office, Extended Search Report, European Application No. 14174979, dated Nov. 3, 2014.

European Patent Office, Communication Pursuant to Article 94(3) EPC, Application No. 14174979 dated Nov. 30, 2015.

Meyer, D. et al., Fingertip Friction Modulation due to Electrostatic Attraction, Conference paper, World Haptics Conference (WHC), 2013.

European Patent Office Application No. 17275085.3, Extended European Search Report dated Sep. 27, 2017, 8 pages.

* cited by examiner

SYSTEMS AND METHODS FOR MONITORING INSULATION INTEGRITY FOR ELECTROSTATIC FRICTION

FIELD OF THE INVENTION

The present invention generally relates to haptic feedback and more particularly to systems and methods for monitoring insulation integrity for electrostatic friction.

BACKGROUND

Touch enabled devices have become increasingly popular. For instance, mobile and other devices may be configured with touch-sensitive displays so that a user can provide input by touching portions of the touch-sensitive display. As another example, a touch enabled surface separate from a display may be used for input, such as a trackpad, mouse, or other device. Furthermore, some touch-enabled devices make use of haptic effects, for example, haptic effects configured to simulate a texture or a friction on a touch-surface. This type of haptic effect can be used to provide information to the user and may be generated using an electrostatic haptic output device. Over time these electrostatic haptic output devices may wear, thus there is a need to monitor this wear.

SUMMARY

Embodiments of the present disclosure include devices featuring surface-based haptic effects that simulate one or more features in a touch area. These haptic effects may include, but are not limited to, changes in texture, changes in coefficient of friction, and/or simulation of boundaries, obstacles, or other discontinuities in the touch surface that can be perceived through use of an object in contact with the surface. Devices including surface-based haptic effects may be more user friendly and may provide a more compelling user experience.

In one embodiment, a system of the present disclosure may comprise a touch sensitive interface configured to detect user interaction; an electrostatic haptic output device configured to output one or more electrostatic haptic effects to the touch sensitive interface; a processor in communication with the touch sensitive interface and the electrostatic haptic output device, the processor configured to: determine an operating condition associated with the electrostatic haptic output device; determine a corrective action associated with the operating condition; and apply the corrective action.

Another embodiment of the present disclosure may comprise program code stored on a non-transitory computer readable medium, the program code configured, when executed by one or more processors, to cause the processors to: receive an input signal from a touch sensitive interface configured to detect user interaction; determine an operating condition associated with an electrostatic haptic output device configured to output an electrostatic haptic effect to the touch sensitive interface; determine a corrective action associated with the operating condition; and apply the corrective action.

Another embodiment of the present disclosure may comprise a method comprising the steps of receiving an input signal from a touch sensitive interface configured to detect user interaction; determining an operating condition associated with an electrostatic haptic output device configured to output an electrostatic haptic effect to the touch sensitive interface; determining a corrective action associated with the operating condition; and applying the corrective action.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Device for Monitoring Insulation Integrity for Electrostatic Friction One illustrative embodiment of the present disclosure comprises a computing system such as a smartphone, tablet, portable music device, or laptop. The computing system can include and/or may be in communication with one or more sensors, such as an accelerometer, as well as sensors (e.g., optical, resistive, or capacitive) for determining a location of a touch relative to a display area corresponding in this example to the screen of the device.

As the user interacts with the device, one or more haptic output devices, for example, electrostatic haptic output devices may provide tactile effects. For example, a haptic effect may be output to simulate the presence of a texture on the surface of the device. In one such embodiment, as the user's finger moves across the surface, an electrostatic haptic effect or other effect, may be output to simulate the feeling of a texture on the surface of the device. Similarly, in another embodiment, as the user contacts the device with a finger, the perceived coefficient of friction of the screen can be varied (e.g., increased or decreased) based on the position, velocity, and/or acceleration of the finger or the length of time the finger has been in contact with the device. In still other embodiments, the device may vary friction based on time. For example, in some embodiments, haptic effects may be output for a certain period of time (e.g., 50 ms) when a certain event occurs, such as crossing a boundary on a touch surface. In other embodiments, the haptic effect may vary with a fixed period, e.g., in an embodiment, a texture may be output that varies at a 100 Hz rate, e.g., a 100 Hz sinusoid.

One or more operating conditions may impact the haptic output device's ability to output haptic effects or the user's perception of the haptic effects. In some embodiments, these operating conditions may be associated with damage to insulation in the electrostatic haptic output device. In such an embodiment, the operating condition may create a safety hazard associated with outputting electrostatic haptic effects, e.g., exposing the user to high voltage without appropriate insulation. In other embodiments, the operating condition may be associated with damage or other conditions that impact the user's perception of the haptic effect.

The illustrative computing device comprises one or more sensors configured to detect operating conditions. These sensors may comprise sensors configured to detect one more of: an impact to the device, damage to a touch surface, damage to an electrostatic insulator, changes in current used by an electrostatic haptic output device, or a substance on the surface of the device that may impact the user's perception of electrostatic haptic effects.

The illustrative computing device is further configured to determine a corrective action associated with the operating condition. This corrective action may configured to address the operating condition by, for example, addressing a safety issue associated with damage to the device, compensating for the operating condition, or correcting the operating condition. For example, in the illustrative embodiment, the corrective action may comprise disabling electrostatic haptic effects in an area of the display associated with damage, or disabling electrostatic haptic effects completely. Further, in another embodiment the corrective action may comprise adjusting the strength or frequency of electrostatic haptic effect. In still other embodiments, the corrective action may comprise initiating a healing function to repair damage to a component of the device, e.g., a touch screen display.

As will be discussed in further detail below, any number of features may impact the user's perception of haptic effects. Embodiments of the present disclosure provide systems and methods for compensating for these features to provide more compelling haptic effects.

Figure 1A:
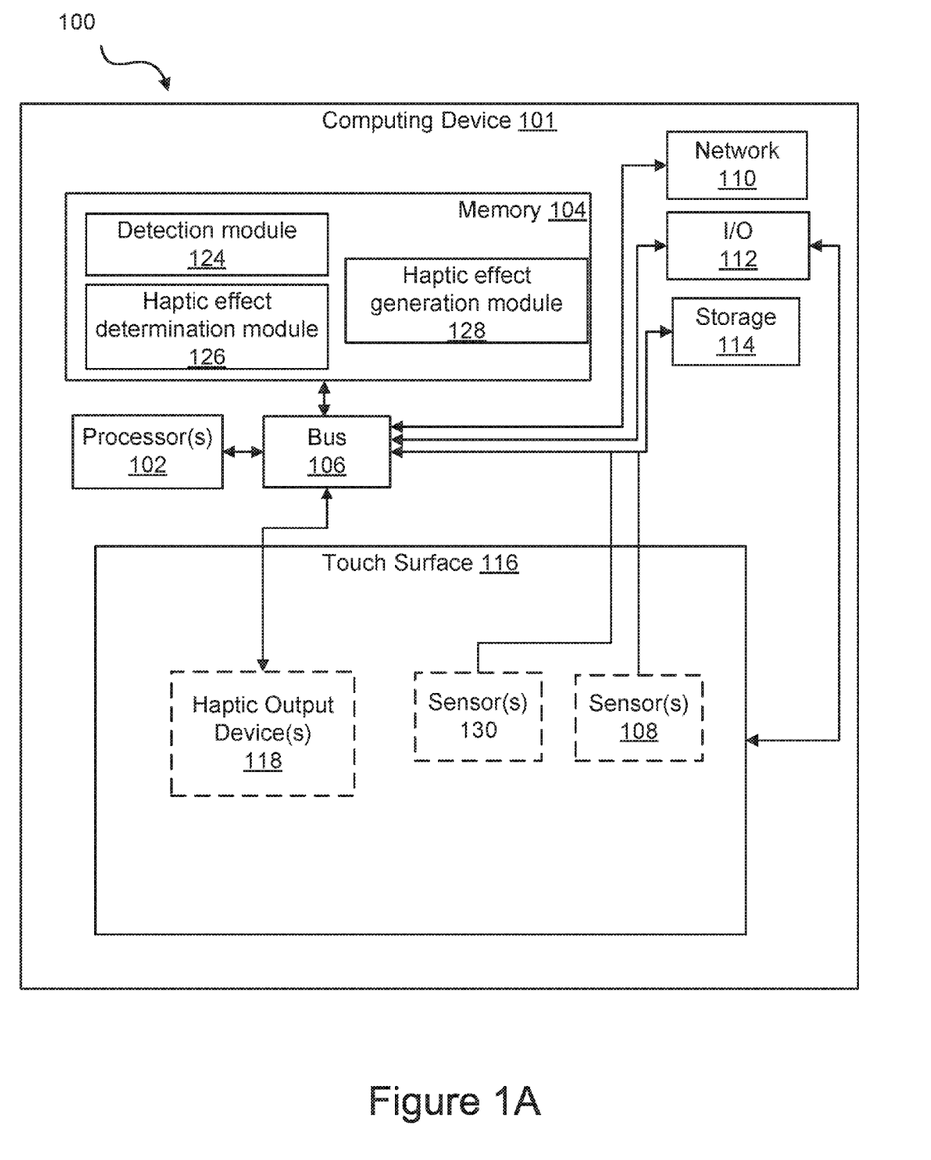
FIG. 1A shows an illustrative system for monitoring insulation integrity for electrostatic friction.

Illustrative Systems for Monitoring Insulation Integrity for Electrostatic Friction FIG. 1A shows an illustrative system 100 for monitoring insulation integrity for electrostatic friction. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (110) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network(s)).

I/O components 112 may be used to facilitate connection to devices such as one or more displays, touch screen displays, keyboards, mice, speakers, microphones, cameras, and/or other hardware used to input data or output data. Storage 114 represents nonvolatile storage such as magnetic, optical, or other storage media included in device 101.

System 100 further includes a touch surface 116, which, in this example, is integrated into device 101. Touch surface 116 represents any surface that is configured to sense touch input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a of the touch surface may be used to determine the touch position.

In some embodiments, sensor 108, touch surface 116, and I/O components 112 may be integrated into a single component such as a touch screen display. For example, in some embodiments, touch surface 116 and sensor 108 may comprise a touch screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor is in communication with a single sensor 108, in other embodiments, the processor is in communication with a plurality of sensors 108, for example, a first touch screen and a second touch screen. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal.

System 100 further comprises one or more sensors 130 configured to detect an operating condition. As discussed above, an operating condition may comprise an impact to the device, damage to a touch surface, damage to an electrostatic insulator, changes in current used by an electrostatic haptic output device, or a substance on the surface of the device that may impact the user's perception of electrostatic haptic effects. For example, in some embodiments, an increase in current may be associated with a short circuit associated with damage to the electrostatic haptic output device. Similarly, in some embodiments, a drop in current may be associated with an open circuit associated with damage to the electrostatic haptic output device. In some embodiments, sensor 130 may comprise an audio detection device configured to detect a sound associated with a collision or cracking. In some embodiments, sensor 130 may comprise an accelerometer or other sensor configured to detect a collision. In still other embodiments, sensor 130 may comprise a sensor configured to detect a change in voltage or current drawn by haptic output devices 118. In still other embodiments, sensor 130 may comprise a grid of conductors placed through touch surface 116 or an insulator of haptic output device 118 and configured to detect a broken circuit or a short circuit, a change in electric field, a change in current, or a change in voltage.

In still other embodiments sensor 130 may comprise a sensor configured to detect one or more substances on touch surface 116, which may impact the user's perception of a haptic effect, e.g., the presence of moisture on the surface of touch surface 116. In another embodiment, sensor 130 may comprise a sensor configured to detect the dryness or hydration of the user's skin. For example, in some embodiments, the sensor 130 may comprise a sensor configured to measure the hydration of the outer layer of the epidermis (e.g., the stratum corneum). In some embodiments, the sensor 130 may comprise a sensor, such as a corneometer, configured to detect changes in the capacitance of the user's skin. In some embodiments, these changes in capacitance may be used to determine the level of hydration of the user's skin. In still another embodiment, the sensor 130 may comprise a sensor configured to detect the conductance of the user's skin, or of any substance on the surface of the user's skin (e.g., a fluid, a chemical, an oil, a cosmetic or pharmaceutical product, or a glove).

In some embodiments, rather than an independent component, sensor 130 may comprise another sensor used by device 101, e.g., sensor 130 may comprise one of I/O components 112, touch surface 116, sensor(s) 108, or haptic output device(s) 118.

Device 101 further comprises a haptic output device 118. In the example shown in FIG. 1A haptic output device 118 is in communication with processor 102 and is coupled to touch surface 116. In some embodiments, haptic output device 118 may apply electrostatic friction or attraction, for example by use of an electrostatic surface actuator, to simulate a texture on the surface of touch surface 116. Similarly, in some embodiments, haptic output device 118 may use electrostatic attraction to vary the friction the user feels on the surface of touch surface 116. For example, in one embodiment, haptic output device 118 may comprise an electrostatic display or any other device that applies voltages and currents instead of mechanical motion to generate a haptic effect. In such an embodiment, an electrostatic actuator may comprise a conducting layer and an insulating layer. In such an embodiment, the conducting layer y be any semiconductor or other conductive material, such as copper, aluminum, gold, or silver. And the insulating layer may be glass, plastic, polymer, or any other insulating material. Furthermore, the processor 102 may operate the electrostatic actuator by applying an electric signal to the conducting layer. The electric signal may be an AC signal that, in some embodiments, capacitively couples the conducting layer with an object near or touching touch surface 116. In some embodiments, the AC signal may be generated by a high-voltage amplifier. In other embodiments the capacitive coupling may simulate a friction coefficient or texture on the surface of the touch surface 116. For example, in one embodiment, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116 or vary the coefficient of friction felt as the object moves across the surface of touch surface 116. Furthermore, in some embodiments, an electrostatic actuator may be used in conjunction with traditional actuators to output haptic effects. In such an embodiment, the actuators may vibrate, while at the same time, an electrostatic actuator may simulate a different texture, or other effects, on the surface of touch surface 116.

In some embodiments, an electrostatic haptic output device may comprise a plurality of cells, each of which is configured to output a haptic effect at a location on the touch surface 116. Sensor 130 may be configured to detect operating conditions associated with each of these cells, e.g., an increase or decrease in current at one cell indicating that the cell may be damaged. Thus, the processor 102 may determine that only certain of the cells comprise an operating condition, and thus, apply the corrective action to only some of the cells.

In some embodiments an electrostatic actuator may be used to generate a haptic effect by stimulating parts of the body near or in contact with the touch surface 116. For example, in some embodiments an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches the touch surface 116 and moves his or her finger on the touch surface, the user may sense a texture of prickliness, graininess, bumpiness, roughness, stickiness, or some other texture.

Although a single haptic output device 118 is shown here, embodiments may use multiple haptic output devices of the same or different type to output haptic effects, for example, to simulate surface textures or vary the perceived coefficient of friction on the touch surface. For example, in one embodiment, a piezoelectric actuator may be used to displace some or all of touch surface 116 vertically and/or horizontally at ultrasonic frequencies, such as by using an actuator moving at frequencies greater than 20-25 kHz in some embodiments. In some embodiments, haptic output device 118 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA). In some embodiments, haptic output device 118 may comprise a plurality of actuators, for example an ERM and an LRA.

Turning to memory 104, exemplary program components 124, 126, and 128 are depicted to illustrate how a device may be configured to monitor insulation integrity for electrostatic friction. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure, and/or other characteristics of the touch over time.

Haptic effect determination module 126 represents a program component that analyzes data regarding touch characteristics to select a haptic effect to generate. Particularly, module 126 comprises code that determines, based on the location of the touch, a simulated feature to generate on the touch surface. Module 126 may further comprise code that selects one or more haptic effects to provide in order to simulate the feature. For example, some or all of the area of touch surface 116 may be mapped to a graphical user interface. Different haptic effects may be selected based on the location of a touch in order to simulate the presence of the feature by simulating a texture on a surface of touch surface 116 so that the feature is felt when a corresponding representation of the feature is seen in the interface. However, haptic effects may be provided via touch surface 116 even if a corresponding element is not displayed in the interface (e.g., a haptic effect may be provided if a boundary in the interface is crossed, even if the boundary is not displayed).

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of texture and utilize signal processing algorithms to generate an appropriate signal to send to haptic output device 118. As a further example, a desired texture may be indicated along with target coordinates for the texture and an appropriate waveform sent to one or more actuators to generate appropriate displacement of the surface (and/or other device components) to provide the texture. Some embodiments may utilize multiple haptic output devices in concert to simulate a feature. For instance, a variation in texture may be used to simulate crossing a boundary between buttons on an interface while a vibrotactile effect simulates the response when the button is pressed.

Figure 1B:
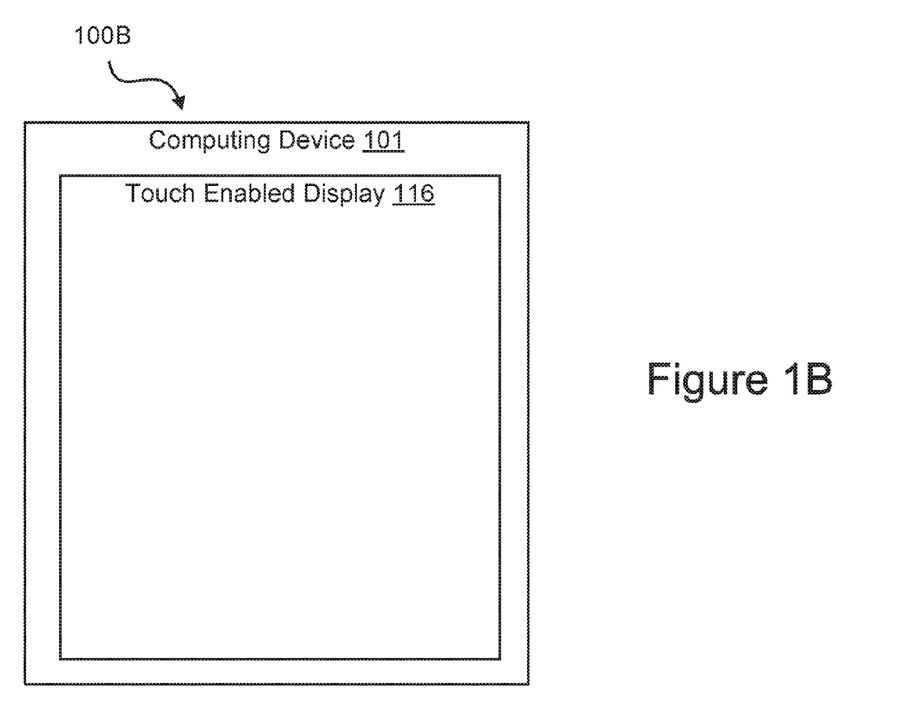
FIG. 1B shows an external view of one embodiment of the system shown in FIG. 1A.

A touch surface may or may not overlay (or otherwise correspond to) a display, depending on the particular configuration of a computing system. In FIG. 1B, an external view of a computing system 100B is shown. Computing device 101 includes a touch enabled display 116 that combines a touch surface and a display of the device. The touch surface may correspond to the display exterior or one or more layers of material above the actual display components.

Figure 1C:
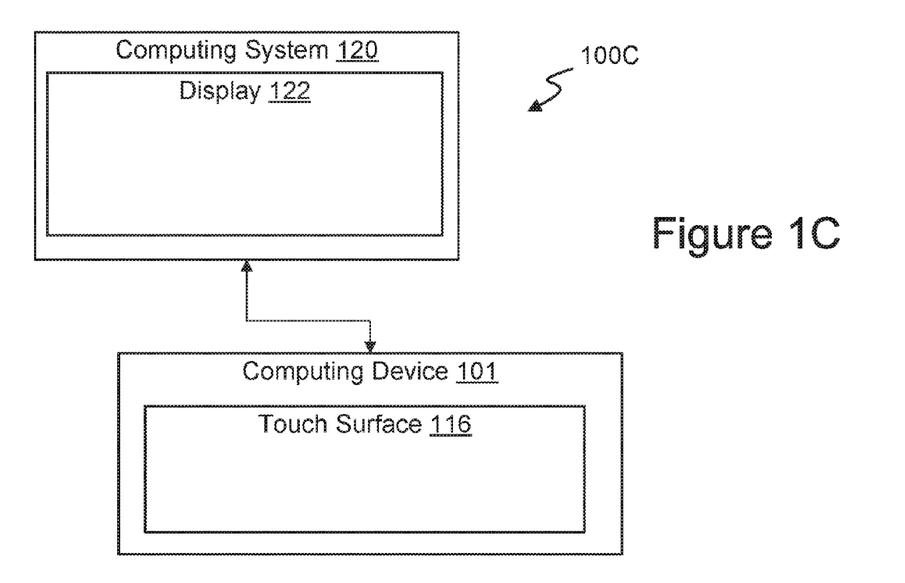
FIG. 1C illustrates an external view of another embodiment of the system shown in FIG. 1A.

FIG. 1C illustrates another example of a touch enabled computing system 100C in which the touch surface does not overlay a display. In this example, a computing device 101 features a touch surface 116 which may be mapped to a graphical user interface provided in a display 122 that is included in computing system 120 interfaced to device 101. For example, computing device 101 may comprise a mouse, trackpad, or other device, while computing system 120 may comprise a desktop or laptop computer, set-top box (e.g., DVD player, DVR, cable television box), or another computing system. As another example, touch surface 116 and display 122 may be disposed in the same device, such as a touch enabled trackpad in a laptop computer comprising display 122. Whether integrated with a display or otherwise, the depiction of planar touch surfaces in the examples herein is not meant to be limiting. Other embodiments include curved or irregular touch enabled surfaces that are further configured to provide surface-based haptic effects.

Figure 2A:
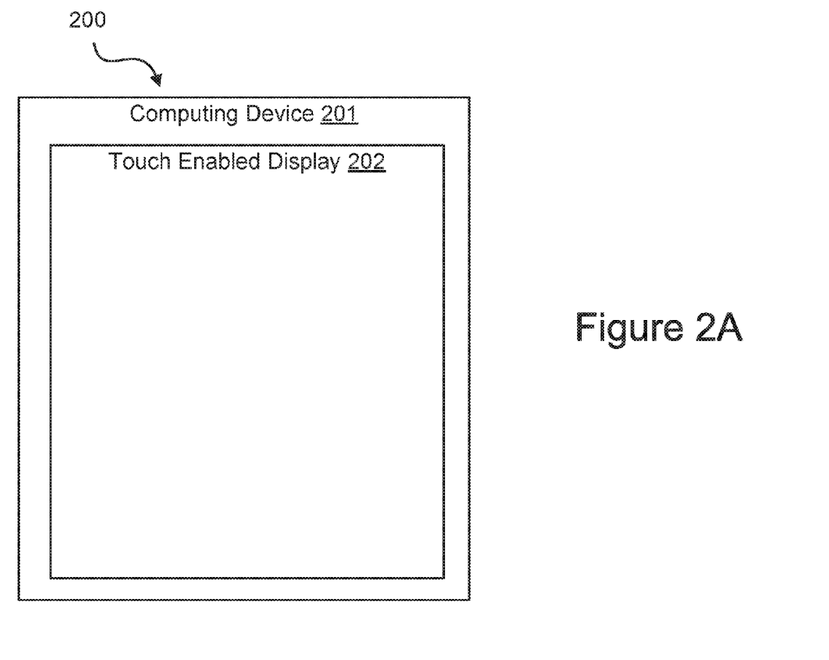
FIG. 2A illustrates an example embodiment for monitoring insulation integrity for electrostatic friction.
Figure 2B:
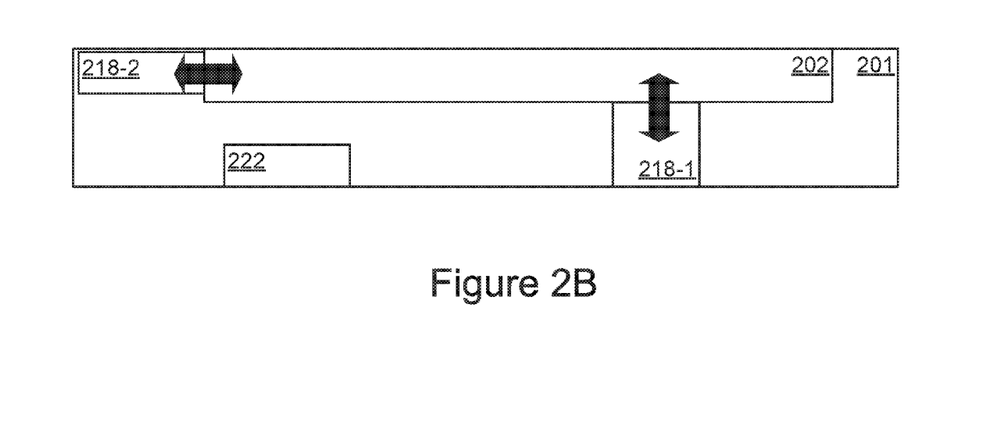
FIG. 2B illustrates an example embodiment for monitoring insulation integrity for electrostatic friction.

FIGS. 2A-2B illustrate an example of devices that may monitor insulation integrity for electrostatic friction. FIG. 2A is a diagram illustrating an external view of a system 200 comprising a computing device 201 that comprises a touch enabled display 202. FIG. 2B shows a cross-sectional view of device 201. Device 201 may be configured similarly to device 101 of FIG. 1A, though components such as the processor, memory, sensors, and the like are not shown in this view for purposes of clarity.

As can be seen in FIG. 2B, device 201 features a plurality of haptic output devices 218 and an additional haptic output device 222. Haptic output device 218-1 may comprise an actuator configured to impart vertical force to display 202, while 218-2 may move display 202 laterally. In this example, the haptic output devices 218 and 222 are coupled directly to the display, but it should be understood that the haptic output devices 218 and 222 could be coupled to another touch surface, such as a layer of material on top of display 202. Furthermore, it should be understood that one or more of haptic output devices 218 or 222 may comprise an electrostatic actuator, as discussed above. Furthermore, haptic output device 222 may be coupled to a housing containing the components of device 201. In the examples of FIGS. 2A-2B, the area of display 202 corresponds to the touch area, though the principles could be applied to a touch surface completely separate from the display.

In one embodiment, haptic output devices 218 each comprise a piezoelectric actuator, while additional haptic output device 222 comprises an electrostatic haptic output device. Haptic output device 222 can be configured to provide an electrostatic haptic effect in response to a haptic signal from the processor. The electrostatic haptic effect can be utilized in conjunction with surface-based haptic effects and/or for other purposes. For example, each haptic output device may be used in conjunction to simulate a texture or vary the coefficient of friction on the surface of display 202.

Figure 3:
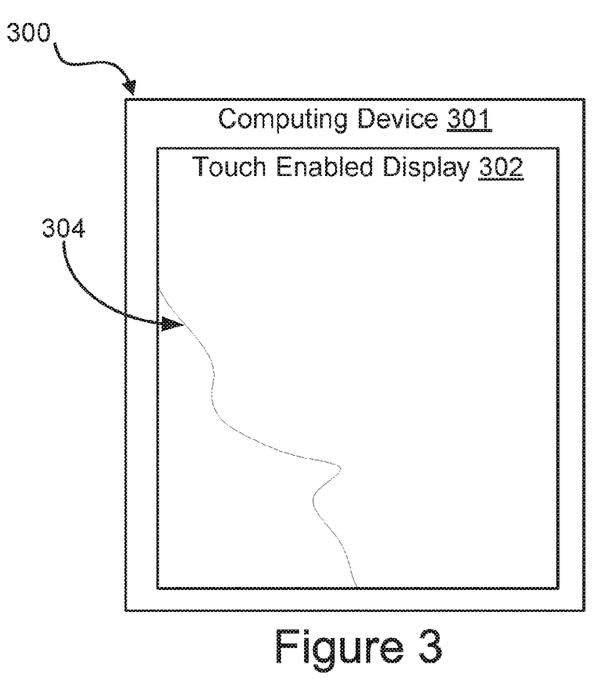
FIG. 3 illustrates another example embodiment for monitoring insulation integrity for electrostatic friction.

Turning to FIG. 3, system 300 is an illustrative example of a system for monitoring insulation integrity for electrostatic friction. FIG. 3 is a diagram illustrating an external view of a system 300 comprising a computing device 301 comprising a touch enabled display 302. Computing device 301 comprises an electrostatic haptic output device for outputting electrostatic haptic effects. Computing device 301 may comprise a portable computing device such as a smartphone, tablet, electronic organizer, media player, or laptop computer. Alternatively, computing device 301 may comprise a desktop computer or a multifunction controller. For example, a controller for use in a kiosk, ATM, or other computing device. Further, in some embodiments, computing device 301 may comprise a controller for use in a vehicle, such as an automobile, airplane, boat, electric-cart, construction equipment, or some other vehicle. Further, in some embodiments, computing device 301 may comprise a controller for use in an appliance, e.g., a refrigerator, oven, dishwasher, washing machine, or any other appliance that may comprise electrostatic haptic effects.

As shown in FIG. 3, the surface of touch enabled display 302 comprises an operating condition in the form of crack 304. In some embodiments, crack 304 may comprise a superficial crack in the surface of the display (e.g., a crack in the screen). Alternatively, in some embodiments, crack 304 may comprise a deep crack that includes a rupture throughout the entire touch screen display mechanism. For example, the crack 304 may extend through an insulator for an electrostatic haptic output device. In some embodiments, crack 304 may expose users to the voltage required to output electrostatic haptic effects. In some embodiments, the crack 304 may impact the strength or feel of the electrostatic haptic effects. In other embodiments, crack 304 may comprise other damage to device 301, for example, a shattered section, a crushed section, a water damaged section, a shear breakage, a bend breakage, or any other type of damage that may be associated with computing device 301.

Computing device 301 comprises a sensor, such as sensor 130, configured to detect the crack 304. In some embodiments, the sensor may comprise an accelerometer configured to detect that computing device 301 has experienced an impact. In some embodiments, the sensor may comprise an audio sensor configured to detect the sound of an impact or of the crack 304 occurring. In still other embodiments, the sensor may comprise a sensor configured to detect a change in current or voltage associated with the crack 304. For example, the sensor may comprise a grid of wires throughout an insulator of the haptic output device or of the touch screen. The sensor may be configured to detect an open circuit, short circuit, or change in electric field. The processor 102 may use this information to determine the location of the crack. In still other embodiments, the sensor may detect a change in the current used by haptic output device 118. The processor may use this change in current to determine the existence of and/or the location of crack 304.

In some embodiments, computing device 301 may comprise a user interface that enables the user to enter a location of crack 304. For example, the user interface my comprise a function to allow the user to indicate that crack 304 exists and confirm the location of crack 304. In such an embodiment, a sensor may detect a likelihood that there is a crack, and trigger a user interface to allow the user to confirm that there is a crack and the location of the crack.

Computing device 301 is further configured to determine a corrective action associated with crack 304. In some embodiments, the corrective action may comprise deactivating or lowering the power of the electrostatic haptic effects. For example, the voltage applied to the electrostatic haptic output device may be reduced to a lower level. In some embodiments, the electrostatic haptic effects may be deactivated or reduced in power at only the location associated with crack 304. Alternatively, in some embodiments, the electrostatic haptic effects may be deactivated entirely.

In some embodiments, computing device 301 may be configured to execute a healing operation. In such an embodiment, the corrective action may comprise the healing operation. The healing operation may comprise repairing all or part of crack 304. In some embodiments, the healing operation may comprise applying current to touch enabled display 302 to change the viscosity of the surface of touch enable display 302, enabling the touch enable display 302 to repair all or part of crack 304.

Figure 4:
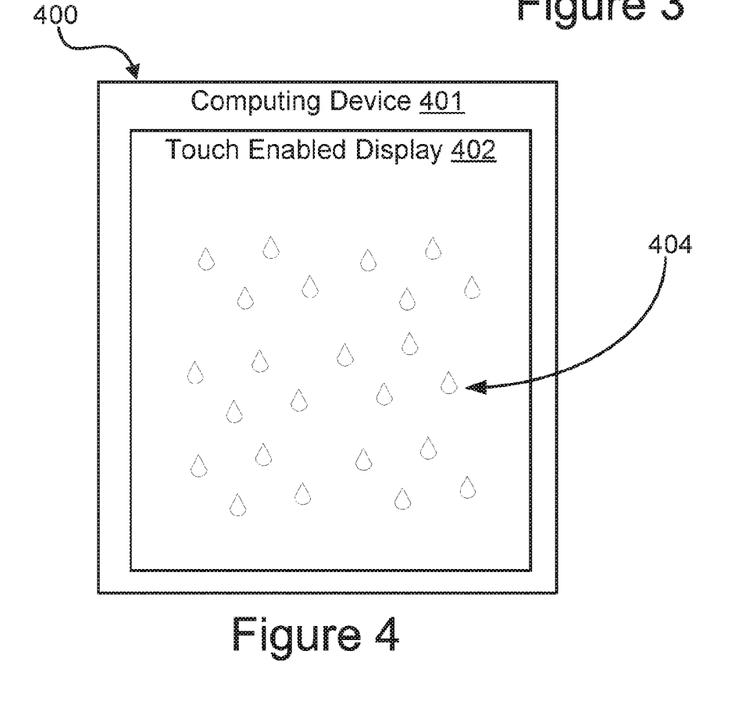
FIG. 4 illustrates another example embodiment for monitoring insulation integrity for electrostatic friction.

Turning now to FIG. 4, FIG. 4 shows system 400 which comprises a computing device 401 with a touch enabled display 402. Computing device 401 comprises an electrostatic haptic output device for outputting electrostatic haptic effects. Computing device 401 comprise a portable computing device such as a smartphone, tablet, electronic organizer, media player, or laptop computer. Alternatively, computing device 401 may comprise a desktop computer or a multi-function controller. For example, a controller for use in a kiosk, ATM, or other computing device. Further, in some embodiments, computing device 401 may comprise a controller for use in a vehicle, such as an automobile, airplane, boat, electric-cart, construction equipment, or some other vehicle. Further, in some embodiments, computing device 401 may comprise a controller for use in an appliance, e.g., a refrigerator, oven, dishwasher, washing machine, or any other appliance that may comprise electrostatic haptic effects.

As shown in FIG. 4, touch enabled display 402 comprises an operating condition in the form of moisture 404. In some embodiments, moisture 404 may comprise condensation on the surface of touch enabled display 402. In other embodiments, moisture 404 may not be present on the surface of touch enabled display 402, but may instead comprise ambient moisture in the environment. In still other embodiments, rather than liquid, moisture 404 may comprise an oil, air, or solid based impediment to the user's contact with the touch enabled display 402. For example, rather than moisture 404, the operating condition may comprise gloves or lotion on the user's hand. In some embodiments, the moisture or other operating condition may be detected by sensor(s) 130 of the type describe above with regard to FIG. 1.

A processor 102 of computing device 401 is configured to determine a corrective action associated with the operating condition e.g., moisture 404. In some embodiments, the corrective action may comprise deactivating or lowering the power of the electrostatic haptic effects. For example, the voltage applied to the electrostatic haptic output device may be reduced to a lower level. In some embodiments, the electrostatic haptic effects may be deactivated or reduced in power at only the location associated with the operating condition. Alternatively, in some embodiments, the electrostatic haptic effects may be deactivated entirely, or deactivated for a period of time.

Figure 5:
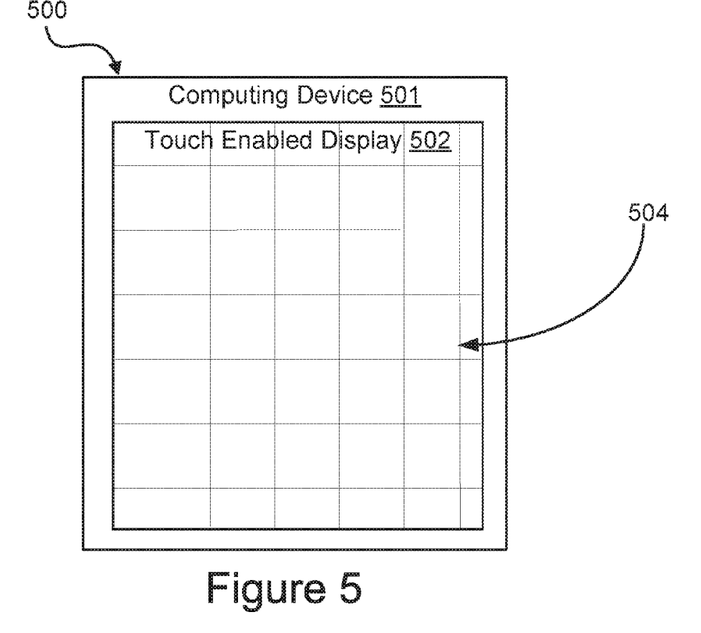
FIG. 5 illustrates another example embodiment for monitoring insulation integrity for electrostatic friction.

Turning now to FIG. 5, FIG. 5 shows a system 500 comprising a computing device 501 with a touch enabled display 502. Computing device 501 may comprise a similar computing device to that described above with regard to FIGS. 3 and 4. Computing device 501 further comprises a grid of conductors 504 placed in the insulator portion of an electrostatic haptic output device. The grid of conductors is configured to detect an operating condition, such as a crack or break in the surface of the touch enabled display or in the insulator of the electrostatic haptic output device. For example, the grid of conductors 504 may enable a sensor coupled to a processor to detect broken circuit or a short circuit, a change in electric field, a change in current, or a change in voltage. Further, using the grid the processor may be able to isolate the location of the operating condition, for example, by determining which of the longitudinal and latitudinal lines of the grid are associated with the operating condition, e.g., the short circuit or the open circuit. Isolating the location of the operating condition may enable the computing device 501 to select a particular corrective action to address the operating condition.

Figure 6:
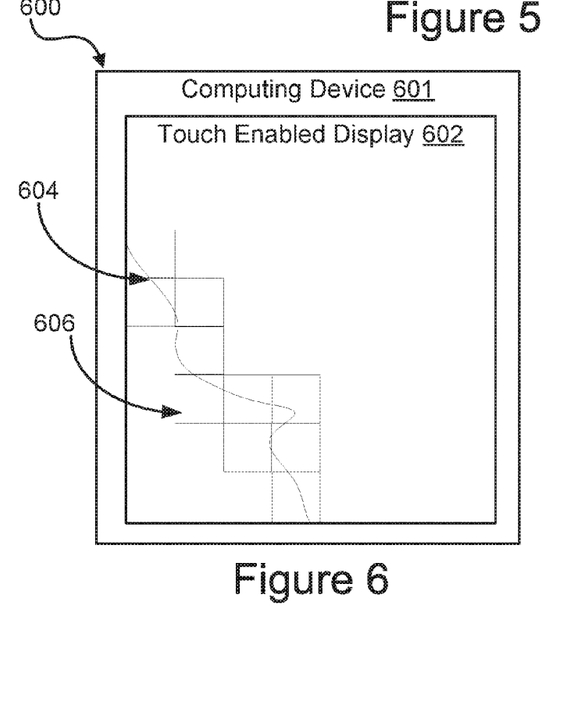
FIG. 6 illustrates another example embodiment for monitoring insulation integrity for electrostatic friction.

Turning now to FIG. 6, FIG. 6 shows a system 600 comprising a computing device 601 with a touch enabled display 602. Computing device 601 may comprise a similar computing device to that described above with regard to FIGS. 3, 4, and 5. Computing device 601 further comprises a crack 604. As shown in FIG. 6, electrostatic cells 606 are shown. Electrostatic cells 606 are at a location associated with the crack 604. In the embodiment shown in FIG. 6, computing device 601 has deactivated electrostatic haptic effects to the electrostatic cells 606. All other electrostatic cells associated with computing device 601 remain active. This prevents the user from potentially being exposed to high voltage at the location of crack 606, while still experiencing haptic effects at other locations along the surface of touch enabled display 602.

Figure 7:
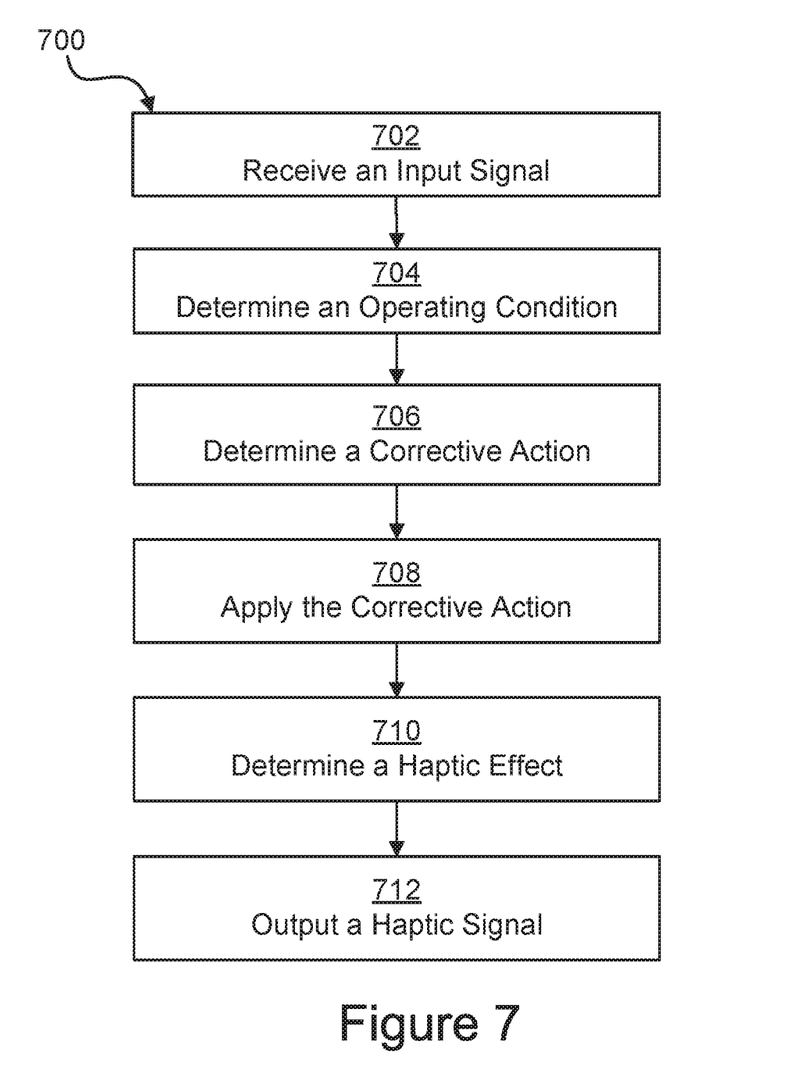
FIG. 7 is a flow chart for a method for monitoring insulation integrity electrostatic friction according to one embodiment.

Illustrative Methods or Monitoring Insulation Integrity for Electrostatic Friction FIG. 7 is a flowchart showing an illustrative method 700 for monitoring insulation integrity for electrostatic friction. In some embodiments, the steps in FIG. 7 may be implemented in program code executed by a processor, for example, the processor in a general purpose computer, mobile device, or server. In some embodiments, these steps may be implemented by a group of processors. In some embodiments the steps shown in FIG. 7 may be performed in a different order. Alternatively, in some embodiments, one or more of the steps shown in FIG. 7 may be skipped, or additional steps not shown in FIG. 7 may be performed. The steps below are described with reference to components described above with regard to system 100 shown in FIG. 1A.

The method 700 begins at step 702 when processor 102 receives an input signal from sensor 108. Sensor 108 may comprise one or more of a plurality of sensors known in the art, for example, resistive and/or capacitive sensors may be embedded in touch surface 116 and used to determine the location of a touch and other information, such as pressure. As another example, optical sensors with a view of the touch surface may be used to determine the touch position. In still other embodiments, sensors 108 and touch surface 116 may comprise a touch screen display.

The method 700 continues when sensor 130 detects an operating condition 704. Sensor 130 is configured to transmit a signal to processor 102, which is configured to determine the operating condition based on that signal. An operating condition may comprise an impact to the device, damage to a touch surface, damage to an electrostatic insulator, changes in current used by an electrostatic haptic output device, or a substance on the surface of the device that may impact the user's perception of electrostatic haptic effects. In some embodiments, sensor 130 may comprise an audio detection device configured to detect a sound associated with a collision or cracking. In some embodiments, sensor 130 may comprise an accelerometer or other sensor configured to detect a collision. In still other embodiments, sensor 130 may comprise a sensor configured to detect a change in voltage or current drawn by haptic output devices 118. In still other embodiments, sensor 130 may comprise a grid of conductors placed through touch surface 116 or an insulator of haptic output device 118 and configured to detect a broken circuit or a short circuit, a change in electric field, a change in current, or a change in voltage. In still other embodiments sensor 130 may comprise a sensor configured to detect one or more substances on touch surface 116, which may impact the user's perception of a haptic effect, e.g., the presence of moisture on the surface of touch surface 116.

In some embodiments, based on the signal received from sensor 130, processor 102 may be configured to isolate the location on touch surface 116 of an operating condition. For example, if haptic output device 118 comprises a grid of conductors in its insulator, processor 102 may be able to determine which of the longitudinal and latitudinal lines of the grid are associated with the operating condition, e.g., the short circuit or the broken circuit. Isolating the location of the operating condition may enable the processor 102 to select a particular corrective action to address the operating condition.

Further in some embodiments, the computing device may comprise a user interface that enables the user to confirm that there is an operating condition and identify the location of the operating condition. In such an embodiment, the processor 102 may use sensor 130 to detect a likelihood that there is an operating condition (e.g., a crack), and trigger a user interface on a display to allow the user to confirm that there is an operating condition and the location of the operating condition.

Next, at step 706, the processor determines a corrective action. In some embodiments, the corrective action nay comprise deactivating or lowering the power of the electrostatic haptic effects. For example, the voltage applied to the electrostatic haptic output device may be reduced to a lower level. In some embodiments, the electrostatic haptic effects may be deactivated or reduced in power at only the location associated with operating condition. Alternatively, in some embodiments, the electrostatic haptic effects may be deactivated entirely.

In some embodiments, computing device 101 may be configured to execute a healing operation. In such an embodiment, the corrective action may comprise the healing operation. The healing operation may comprise repairing all or part of the operating condition. For example, in some embodiments, the healing operation may comprise applying current to the touch surface 116 to change the viscosity of its surface, enabling the touch enable display 116 to repair all or part of the operating condition (e.g. a crack or other breakage).

The process 700 continues when the processor applies the corrective action 708. At this step the processor may deactivate all or part of the electrostatic output. The electrostatic haptic output may be deactivated permanently, if the operating condition is permanent. Alternatively, if the operating condition is temporary, e.g., moisture on touch surface 116, the electrostatic haptic output may be deactivated only temporarily. Further, if the computing device 101 features a healing function, the processor 102 may apply the healing function.

Next, at step 710, the processor 102 determines a haptic effect. In some embodiments, the haptic effect may comprise a variation in the coefficient of friction on touch surface 116. In other embodiments, the haptic effect may comprise a simulated texture on the surface of touch surface 116 (e.g., the texture of one or more of: water, grass, ice, metal, sand, gravel, brick, fur, leather, skin, fabric, rubber, leaves, or any other available texture). In some embodiments, processor 102 may rely on programming contained in haptic effect determination module 126 to determine the haptic effect. For example, the processor 102 may access drive signals stored in memory 104 and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

Further, in some embodiments, users may be able to select a texture or other haptic effect in order to customize computing device 101. For example, in some embodiments, a user may select a haptic effect such as a surface texture to allow for personalization of the feel of a touch interface. In some embodiments, the user may select these personalized haptic effects or surface textures through modifying settings or downloading software associated with particular effects. In other embodiments, the user may designate effects through detected interaction with the device. In some embodiments, this personalization of haptic effects may increase the user's sense of ownership and the connection between the user and his or her device.

In still other embodiments, device manufacturers or software developers may select distinctive haptic effects, such as surface textures, to brand their devices or user interfaces. In some embodiments, these haptic effects may be unique to branded devices and similar to other distinctive elements that may increase brand awareness. For example, many mobile devices and tablets may comprise a custom or branded home screen environment. For example, in some embodiments, devices produced by different manufacturers may still comprise the same operating system; however, manufacturers may distinguish their devices by modifying this home screen environment. Thus, in some embodiments, some device manufacturers or software developers may use haptic effects such as textures or friction based effects either in home screens or in other user interfaces to create a unique and differentiated user experience.

The method 700 continues when processor 102 outputs a haptic signal associated with the haptic effect 712. The processor 102 outputs the haptic signal to a haptic output device 118 configured to output the haptic effect. In some embodiments, haptic output device 118 may comprise electrostatic actuators configured to simulate textures or vary coefficients of friction using electrostatic fields. In some embodiments, processor 102 may control a plurality of haptic output devices to simulate multiple haptic effects. For example, in one embodiment, processor 102 may control an electrostatic actuator to simulate a texture on the surface of touch surface 116 and processor 102 may further control other haptic output devices 118 to simulate other features. For example, haptic output devices 118 may comprise actuators configured to output other effects, such as vibrations configured to simulate barriers, detents, movement, or impacts on touch surface 116. In some embodiments, processor 102 may coordinate the effects so the user can feel a plurality of effects together when interacting with touch surface 116.

Advantages of Monitoring Insulation Integrity for Electrostatic Friction

There are numerous advantages of monitoring insulation integrity for electrostatic friction. For example, in some embodiments perceptual normalization may lead to safer operation of devices featuring electrostatic haptic capability. An electrostatic haptic output device may output voltages of over 200 volts in order to output a perceptible effect. An insulator is required to ensure that the user is not exposed to this voltage. However, mobile devices may be dropped, resulting in damage to the insulator. This damage may lead the user to be exposed to the voltage. Embodiments described herein can repair the damage or adjust the haptic effect to ensure that the user is not exposed to the higher voltage. This may increase user satisfaction and further adoption of mobile devices featuring electrostatic haptic effects.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system for outputting haptic effects comprising:
   a touch sensitive interface configured to detect user interaction, wherein the touch sensitive interface comprises a conductive grid;
   an electrostatic haptic output device configured to output one or more electrostatic haptic effects to the touch sensitive interface;
   a processor in communication with the touch sensitive interface and the electrostatic haptic output device, the processor configured to:
      monitor the conductive grid to determine damage to the electrostatic haptic output device;
      determine an operating condition associated with the electrostatic haptic output device;
      determine a corrective action associated with the operating condition; and
      apply the corrective action.

2. The system of claim 1, wherein the processor is further configured to:
   determine a haptic effect based in part on the user interaction; and
   output a haptic signal associated with the haptic effect to the electrostatic haptic output device.

3. The system of claim 1, wherein the corrective action comprises disabling one or more cells of the electrostatic haptic output device.

4. The system of claim 3, wherein the processor is configured to determine that the operating condition is associated with one or more cells of the electrostatic haptic output device and the corrective action comprises disabling only the one or more cells.

5. The system of claim 1, wherein the corrective action comprises reducing power to one or more cells of the electrostatic haptic output device.

6. The system of claim 1, wherein the corrective action comprises initiating a healing operation to the electrostatic haptic output device.

7. The system of claim 6, wherein the healing operation comprises applying additional current to an insulating layer of the electrostatic haptic output device.

8. The system of claim 1, wherein the touch sensitive interface comprises a touch screen display and the electrostatic haptic output device is coupled to the touch screen display.

9. The system of claim 1, wherein determining an operating condition comprises one or more of: determining damage to the electrostatic haptic output device, determining moisture on a surface of the electrostatic haptic output device, determining a change in current drawn by the electrostatic haptic output device, detecting an impact to the electrostatic haptic output device, determining a level of moisture on a user's skin, or detecting user input associated with damage to the electrostatic haptic output device.

10. A non-transitory computer readable medium comprising program code, which when executed by one or more processors is configured to cause the processors to:
    receive an input signal from a touch sensitive interface configured to detect user interaction, wherein the touch sensitive interface comprises a conductive grid;
    monitor the conductive grid to determine damage to an electrostatic haptic output device;
    determine an operating condition associated with the electrostatic haptic output device configured to output an electrostatic haptic effect to the touch sensitive interface;
    determine a corrective action associated with the operating condition; and
    apply the corrective action.

11. The non-transitory computer readable medium of claim 10, further comprising program code, which when executed by the one or more processors is configured to cause the one or more processors to:
    determine a haptic effect based in part on the user interaction; and
    output a haptic signal associated with the haptic effect to the electrostatic haptic output device.

12. The non-transitory computer readable medium of claim 10, wherein the corrective action comprises disabling one or more cells of the electrostatic haptic output device.

13. The non-transitory computer readable medium of claim 12, further comprising program code, which when executed by the one or more processors is configured to cause the one or more processors to determine that the operating condition is associated with one or more cells of the electrostatic haptic output device and the corrective action comprises disabling only the one or more cells.

14. The non-transitory computer readable medium of claim 10, wherein the corrective action comprises reducing power to one or more cells of the electrostatic haptic output device.

15. The non-transitory computer readable medium of claim 10, wherein the corrective action comprises initiating a healing operation to the electrostatic haptic output device.

16. The non-transitory computer readable medium of claim 15, wherein the healing operation comprises applying additional current to an insulating layer of the electrostatic haptic output device.

17. The non-transitory computer readable medium of claim 10, wherein determining a failure point comprises one or more of: determining damage to the electrostatic haptic output device, determining moisture on a surface of the electrostatic haptic output device, determining a change in current drawn by the electrostatic haptic output device, detecting an impact to the electrostatic haptic output device, determining a level of moisture on a user's skin, or detecting user input associated with damage to the electrostatic haptic output device.

18. A method for outputting haptic effects comprising:
receiving an input signal from a touch sensitive interface configured to detect user interaction, wherein the touch sensitive interface comprises a conductive grid;
monitoring the conductive grid to determine damage to an electrostatic haptic output device;
determining an operating condition associated with the electrostatic haptic output device configured to output an electrostatic haptic effect to the touch sensitive interface;
determining a corrective action associated with the operating condition; and
applying the corrective action.

* * * * *

UNITED STATES PATENT AND TRADEMARK OFFICE
CERTIFICATE OF CORRECTION

| | | |
|---|---|---|
| PATENT NO. | : 9,983,675 B2 | Page 1 of 1 |
| APPLICATION NO. | : 15/179133 | |
| DATED | : May 29, 2018 | |
| INVENTOR(S) | : Kaniyalal Shah and Vincent Levesque | |

It is certified that error appears in the above-identified patent and that said Letters Patent is hereby corrected as shown below:

In the Specification

In Column 4, Line 3, delete "input/output (110)" and insert -- input/output (I/O) --

In Column 4, Line 30, delete "a of the touch" and insert -- a view of the touch --

In Column 4, Line 33, delete "1/O" and insert -- (I/O) --

In Column 5, Line 49, delete "layer y be any" and insert -- layer may be any --

In Column 9, Line 50, delete "device 401 comprise" and insert -- device 401 may comprise --

Signed and Sealed this
Twenty-sixth Day of March, 2019

Andrei Iancu
*Director of the United States Patent and Trademark Office*